Oct. 25, 1955 C. B. VINCENT 2,721,426
SHAKING BARREL APPARATUS FOR POLISHING
OR CLEANING SMALL ARTICLES
Filed Jan. 21, 1953 3 Sheets-Sheet 1
FIG.I.
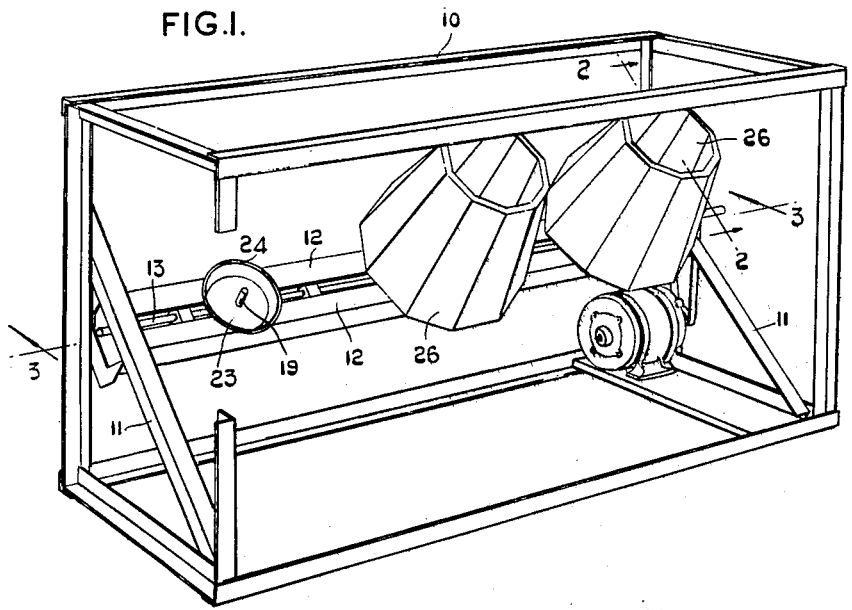
FIG.5.
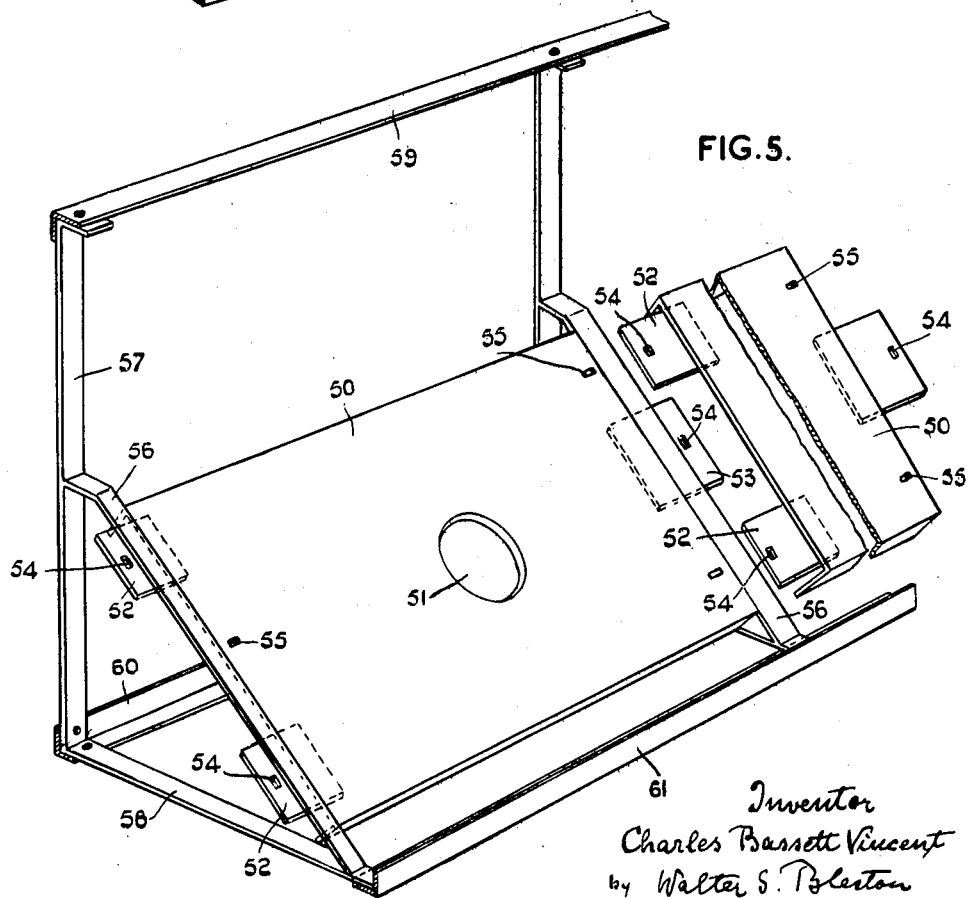
Inventor
Charles Bassett Vincent
by Walter S. Pleston
ATTORNEY

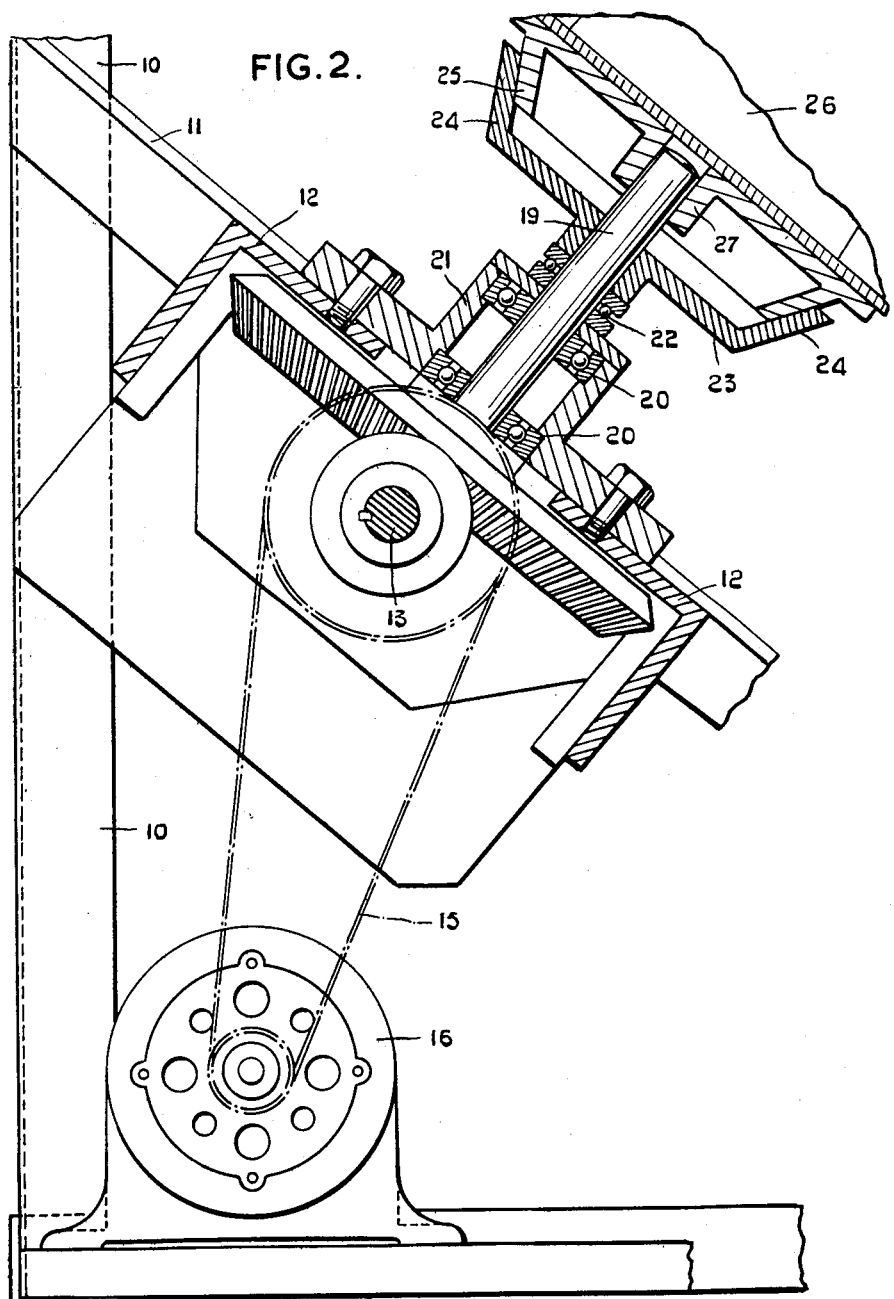

Oct. 25, 1955    C. B. VINCENT    2,721,426
SHAKING BARREL APPARATUS FOR POLISHING
OR CLEANING SMALL ARTICLES
Filed Jan. 21, 1953    3 Sheets-Sheet 3

Inventor:
Charles Bassett Vincent
by Walter S. Bleston
ATTORNEY

United States Patent Office 2,721,426
Patented Oct. 25, 1955

2,721,426

SHAKING BARREL APPARATUS FOR POLISHING OR CLEANING SMALL ARTICLES

Charles Bassett Vincent, Birmingham, England

Application January 21, 1953, Serial No. 332,154

Claims priority, application Great Britain January 24, 1952

11 Claims. (Cl. 51—164)

This invention relates to improvements in shaking barrel apparatus for polishing or cleaning small articles, and the object of the invention is to provide improved means for mounting and driving the barrels.

According to my invention shaking barrel apparatus comprises a number of spaced parallel spindles of which the axes are inclined to the vertical and which are mounted in ball or roller bearings in a skeleton frame, means on the upper end of each spindle for detachably receiving and driving a shaking barrel, and means for driving all the spindles simultaneously by a common driving motor, the drive including a horizontal shaft driven by the motor and carrying at least one bevel pinion or worm meshing with a bevel wheel or worm wheel on one spindle.

The shaft is conveniently mounted in spaced ball or roller journal bearings in the frame and is driven by an electric motor on the frame through a belt or chain or through gearing so that the assembly forms a self-contained unit which can be located in any convenient position in a works or may be supported by brackets on a wall.

One, two or more vertically spaced rows of spindles each adapted to receive a shaking barrel may be mounted in a common frame, the spindles in each row being driven by a separate horizontal shaft and the shafts being driven by the same motor or by separate motors.

In one practical arrangement the horizontal shaft extends below all the spindles in a row and each spindle carries on its lower end a bevel wheel or worm wheel meshing with a bevel pinion or worm on the shaft so that all the spindles are driven directly from the shaft.

In an alternative arrangement only the end spindle in a row is driven through bevel or worm gearing from the driving shaft. That spindle carries on its lower end below the bevel or worm wheel a pulley which is coupled by a V belt to a similar pulley on the second spindle, and the third spindle is driven from the second by another V belt and so on.

One practical shaking barrel apparatus in accordance with the invention and two modifications are illustrated by way of example in the accompanying drawings in which:

Figure 1 is a perspective view of an apparatus embodying three shaking barrels.

Figure 2 is a vertical section on a larger scale on the line 2—2 of Figure 1.

Figure 5 is a perspective view of an alternative type of frame which permits any desired number of units to be built up.

Figure 3:
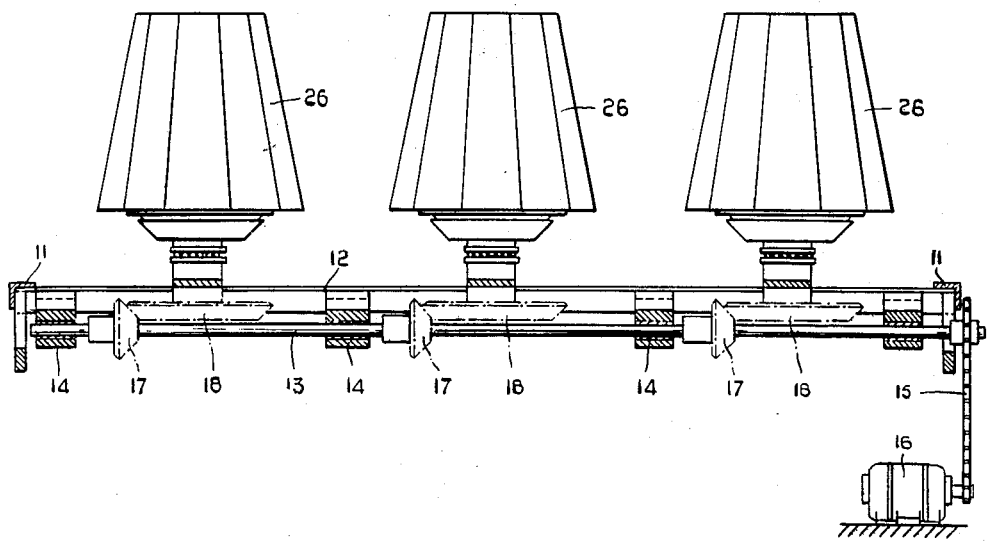
Figure 3 is a longitudinal section on the line 3—3 of Figure 1.

In the apparatus illustrated in Figures 1 to 3, 10 is a skeleton rectangular framework built up from rolled steel sections riveted or welded together. The frame is braced at each end by inclined angle-section members 11. Extending between the members 11 are two spaced horizontal angle-section members 12, the upper flanges of these members lying in a common plane which is inclined at the same angle as the members 11.

A longitudinal shaft 13 extends below the members 12 and is rotatably mounted in spaced journal bearings 14 secured to the underside of the members 12. These may be plain bearings or may be ball or roller bearings. The shaft is driven at one end by a belt or chain 15 from an electric motor 16 fixed to the base of the frame.

At suitably spaced intervals the shaft 13 carries bevel pinions 17 meshing with bevel wheels 18 on the lower ends of inclined spindles 19 of which the axes are at right angles to the upper flanges of the members 12. Each spindle 19 is rotatably mounted in spaced ball bearings 20 in a housing 21 which is bolted to the members 12 and extends across the gap between them. A thrust bearing 22 is provided at the upper end of the housing to take the axial load on the spindle. The upper end of the spindle carries a disc or cup member 23 having in its upper face a circular recess with an outwardly inclined or coned peripheral wall 24 to receive a complementary boss 25 on the lower end of a shaking barrel 26. The spindle extends upwardly a short distance through the disc or cup and is adapted to be received in a bush 27 in the centre of the boss 25. The barrel is thus positively located and the engagement of the coned boss 25 on the barrel in the coned recess in the disc or cup drivably couples the barrel to the spindle but allows the barrel to be lifted off or replaced without stopping the drive to the spindle which is common to the other spindles. Thus any one of the barrels can be lifted off for the removal of its contents and the insertion of fresh articles without stopping the motor which drives the shaft 13.

Preferably the bevel wheels 18 are of cast-iron and the pinions 17 are of steel so that they will run without regular lubrication, and as the spindles are mounted in ball or roller bearings which can be packed with grease initially the apparatus requires a minimum of maintenance.

In a modification the lower ends of the spindles carry worm wheels meshing with worms on the shaft 13 and in that case the shaft will be offset from the plane containing the axes of the spindles.

Figure 4:
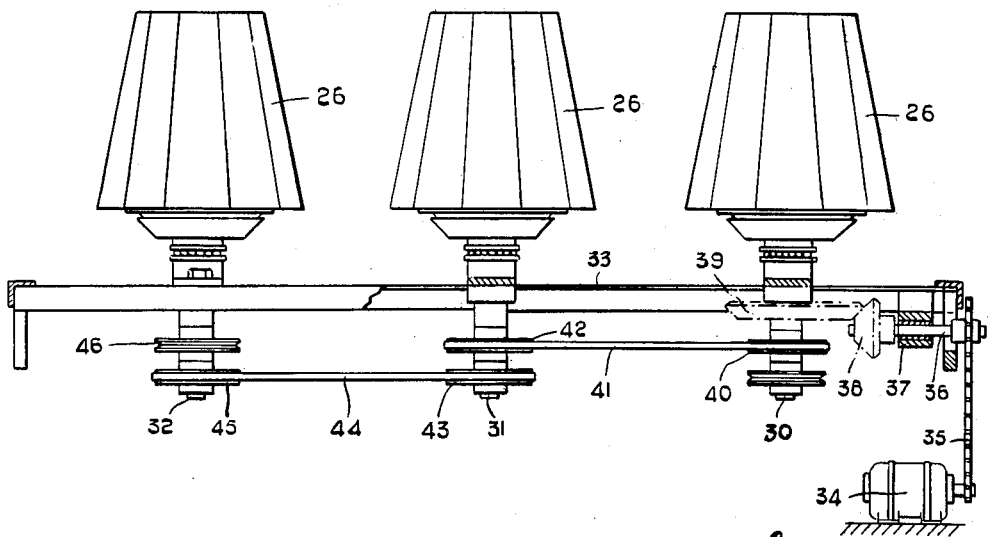
Figure 4 is a section similar to Figure 3 but embodying an alternative form of drive.

In the alternative method of driving a number of spindles carrying shaking barrels shown in Figure 4 the spindles 30, 31, 32 are mounted in bearings as described above secured to longitudinal frame members 33. An electric motor 34 drives through a belt or chain 35 a short shaft 36 mounted in a bearing 37 secured to the frame. A bevel pinion 38 on the end of the shaft meshes with and drives a bevel wheel 39 on the first spindle 30. The spindle is extended downwardly and carries a pulley 40 from which the drive is transmitted through a V belt 41 to a similar pulley 42 on the second spindle 31. A second pulley 43 on that spindle is coupled by a belt 44 to a similar pulley 45 on the spindle 32. A second pulley 46 is mounted on that spindle so that the drive can be transmitted to a pulley on a further spindle and so on.

Figure 5 shows a frame built up from units of which any desired number can be assembled together according to the number of shaking barrels required. The main parts of the frame comprise steel plates 50 each having cranked flanges on its top and bottom edges and having a central opening 51 over which a bearing for a spindle to carry a shaking barrel can be mounted. Spaced lugs 52 are welded to one end of the plate and a single central lug 53 is welded to the other end. These lugs are pierced at 54 and corresponding holes 55 are formed in the edges of the adjacent plates so that any desired number of plates can be bolted together end to end and will be rigidly held together in accurate alignment with each other.

The plates are supported by inclined members 56 of a skeleton frame, these members being bolted or welded to upright and horizontal members 57, 58 which are connected by horizontal longitudinal angle-section members 59, 60, 61.

As the plates 50 and their connections to each other are rigid only a light supporting frame is necessary.

In the apparatus illustrated there is a single row of spindles carrying shaking barrels but it will be appreciated that a frame may be designed to accommodate two or more rows of spindles and the driving shafts for all the spindles may be driven from a common motor.

I claim:

1. Shaking barrel apparatus comprising a skeleton frame, a bed on the frame presenting an inclined flat upper surface, a plurality of spaced housings mounted on said surface of the bed, a spindle journalled in each housing and held fast against axial displacement, each spindle projecting upwardly and outwardly with respect to the plane of the bed, a power unit mounted on the frame, driving means located beneath the bed and drivably coupled to the lower ends of the spindles and adapted to drive all the spindles simultaneously from the power unit, a cup-like member carried on each spindle and including a bottom portion and an upwardly projecting rim, the upper end portion of said spindle projecting upwardly from said bottom portion and said rim defining a conical seating spaced from and surrounding the upper end portion of the spindle, a shaking barrel associated with each spindle, a boss projecting from the base of each barrel and including an axial socket adapted to receive the upper end portion of the spindle, and a conical peripheral wall complementary to said conical seating, whereby the barrel can be drivably coupled to the spindle, while the latter is rotating, by an engagement of said rim with said peripheral wall after coaxiality of said spindle and said barrel having been ensured by said spindle end engaging in said socket.

2. Shaking barrel apparatus as specified in claim 1 wherein each housing includes a hollow cylindrical portion providing, internally, seatings for spaced anti-friction bearings in which the spindle is journalled and, externally, adjacent an upper end of the housing, a flat seating for a thrust bearing adapted to take the axial loading on the spindle.

3. Shaking barrel apparatus as specified in claim 1 wherein the bed on the frame is made up of two spaced angle-section members, a flange of each section lying in a common inclined plane and defining the flat upper surface of the bed, and the housings having each a flat base lying upon and straddling the flanges of the angle-section bed.

4. Shaking barrel apparatus as specified in claim 1 wherein the bed on the frame is made up of rigid flanged plates on each of which one of said housings is mounted, and means on the ends of the plates for rigidly connecting them together and in alignment with each other.

5. In an apparatus of the type described, comprising a plurality of inclined spindles rotatable simultaneously by a power unit, a shaking barrel for each spindle and having an axis of rotation, and means whereby each barrel can be successively engaged and disengaged from the co-ordinate spindle, while the latter is rotating, said means comprising a conical annular seating coaxially secured to each spindle so as to surround the upper end portion of said spindle at a radial distance thereof, a socket in the base of each barrel coaxial therewith and adapted to receive therein the upper end portion of the co-ordinate spindle, and a conical annular boss projecting from the base of said barrel and coaxial with said socket, said boss and seating being complementary and adapted frictionally to engage in a positive manner with each other when the socketed base of the barrel is mounted on the upper end portion of the spindle.

6. In a shaking barrel apparatus, means drivably coupling a shaking barrel with a constantly rotating spindle of the apparatus, comprising an exposed end portion of the spindle, an annular seating spaced from and coaxially surrounding said exposed end portion of the spindle, a conical inner peripheral wall on the seating, a socket in the base of the barrel adapted to accommodate the exposed end portion of the spindle, an annular boss projecting from the base of the barrel and coaxially surrounding the socket at a radial distance therefrom, and a conical outer peripheral wall on the boss, said conical peripheral walls being complementary and in positive driving engagement with each other when the socketed base of the barrel is mounted on the exposed end of the spindle.

7. Shaking barrel apparatus comprising, in combination, a skeleton framework, a bed on the framework lying in an inclined plane, a plurality of housings mounted separately on the bed and arranged in a row, an upwardly and outwardly inclined spindle journalled for rotation in each housing, a power unit on the framework and driving connections between the latter and the lower end of each spindle, an annular conical seating surrounding and spaced from the upper end portion of each spindle, a shaking barrel having a socket in the base of the barrel to accommodate the upper end portion of the spindle, and a conical boss projecting from the base of the barrel, said conical seating and boss being complementary and in positive driving engagement when the socketed base of the barrel is mounted on the upper end of the spindle.

8. Shaking barrel apparatus as specified in claim 7, wherein said driving connections comprise a gear wheel on the lower end of each spindle, a horizontal shaft arranged beneath and in line with the lower ends of said spindles, gear members on the shaft in constant mesh with said gear wheels on the spindles, and a flexible driving connection between said shaft and power unit.

9. Shaking barrel apparatus as specified in claim 7, wherein said driving connections comprise a gear wheel on the lower end of one spindle, a stub shaft mounted on the framework beneath said gear wheel, a gear member on the shaft in constant mesh with said gear wheel, flexible driving connections between said geared spindle and the lower ends of the remaining spindles in the row, and a flexible driving element transmitting motion from the power unit to the stub shaft.

10. Shaking barrel apparatus comprising a skeleton frame, a plurality of spindles journalled in said frame and parallel with one another, said spindles having their axes inclined to the horizontal and being held against axial displacement, a power unit mounted on said frame, driving means connecting said power unit to all of said spindles, a cup member mounted on and fast with each spindle, said cup member including a bottom portion through which the upper end portion of said spindle projects, and an inner peripheral wall of conical shape, said wall defining an annular conical seating spaced from said spindle, a shaking barrel associated with each spindle, a boss formed on the base of said barrel, an axial socket in said boss, said socket being adapted to fit detachably over the upper end portion of said spindle, and an outer conical peripheral wall on said boss, said outer wall defining an annular conical surface, said surface being complementary to said conical seating on said cup members and adapted to transmit the drive from said spindle to said barrel when said conical surface and seating engage each other after said spindle end portion has entered said socket.

11. In a shaking barrel apparatus, a supporting frame, a plurality of spindles journalled in said frame with their axes inclined from the vertical, a driving linkage on the frame connecting the several spindles for joint rotation about said axes, cup members carried by the several spindles each including a flat bottom normal to the associated spindle axis and a frustro-conical peripheral wall flaring in a direction outwardly from the bottom, and shaking barrels removably seated upon and rotatable with the respective spindles in coaxial alignment therewith, each barrel being formed with a flat bottom including an axially recessed center bush in which the associated spindle normally engages so as to ensure said alignment, each bush being free of direct connections to the associated spindle and having a slip fit thereon to permit the barrel to be held against rotation and shifted axially of the spindle out of engagement therewith during continued rotation of the spindle, the bottom of each barrel further including a frustro-conical peripheral flange tapering in a direction outwardly from the barrel bottom in concentric relation to the bush to complement said wall, thus to frictionally seat against the wall in the spindle-engaging, rotating position of the barrel, said flange in its fully seated position having its smaller and larger ends spaced from the smaller and larger ends, respectively, of said wall, and each spindle in the fully seated position of the flange being extended within a part only of the length of the axial recess of the associated bush.

References Cited in the file of this patent

UNITED STATES PATENTS

| | | |
|---|---|---|
| 919,668 | Williams | Apr. 27, 1909 |
| 998,257 | Nickerson | July 18, 1911 |
| 2,012,486 | Strauss | Aug. 27, 1935 |
| 2,561,037 | Stanley | July 17, 1951 |

FOREIGN PATENTS

| | | |
|---|---|---|
| 801,499 | Germany | Jan. 8, 1951 |